(12) United States Patent
Kashyap et al.

(10) Patent No.: US 8,972,802 B2
(45) Date of Patent: Mar. 3, 2015

(54) PROVIDING HIGH AVAILABILITY TO A HYBRID APPLICATION SERVER ENVIRONMENT CONTAINING NON-JAVA CONTAINERS

(75) Inventors: Amith N. Kashyap, Bangalore (IN); Rohit D. Kelapure, Morrisville, NC (US); Hariharan N. Venkitachalam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 13/559,860

(22) Filed: Jul. 27, 2012

(65) Prior Publication Data

US 2014/0033205 A1     Jan. 30, 2014

(51) Int. Cl.
    *G06F 11/00*     (2006.01)
(52) U.S. Cl.
    USPC ................................ 714/55; 714/4.1; 714/2
(58) Field of Classification Search
    USPC ............................................ 714/55, 25, 38.1
    See application file for complete search history.

(56) References Cited

U.S. PATENT DOCUMENTS

| | | | |
|---|---|---|---|
| 7,634,683 B2 | 12/2009 | De La Cruz et al. | |
| 7,917,800 B2 | 3/2011 | Cohn et al. | |
| 2003/0056029 A1* | 3/2003 | Huang et al. | 709/328 |
| 2006/0015852 A1* | 1/2006 | Parkinson et al. | 717/126 |
| 2006/0242223 A1* | 10/2006 | Shawver et al. | 709/201 |
| 2007/0240171 A1* | 10/2007 | Biro et al. | 719/328 |
| 2009/0070623 A1 | 3/2009 | Sciacca | |
| 2011/0145631 A1 | 6/2011 | Shankar et al. | |
| 2012/0047394 A1* | 2/2012 | Jain et al. | 714/4.11 |

OTHER PUBLICATIONS

"ActiveBatch® Non-Cluster Failover Package for High Availability," http://www.advsyscon.com/products/activebatch/ncf.asp, 2012.
IBM, "Implementing Failover in a Polling Adapter Without Support from an Application Server," IPCOM Disclosure No. IPCOM000166657D, http://ip.com/IPCOM/000166657, Jan. 18, 2008.

(Continued)

*Primary Examiner* — Sarai Butler
(74) *Attorney, Agent, or Firm* — Robert A. Voigt, Jr.; Winstead, P.C.

(57) ABSTRACT

A method, system and computer program product for providing high availability to a hybrid application server environment containing non-Java® containers. Each hybrid application server in the cluster includes a Java® container and a non-Java® container hosting Java® and non-Java® applications, respectively. Upon detecting the non-Java® container becoming unavailable (failing), an object, such as an MBean, identifies and deactivates those Java® application(s) that are dependent on the non-Java® application(s) deployed in the unavailable non-Java® container using dependency information stored in an application framework. The deactivated Java® application(s) are marked as being unavailable. A routing agent continues to send requests to those Java® application(s) that are not marked as being unavailable within that hybrid application server containing the unavailable non-Java® container. As a result of not deactivating the entire hybrid application server containing the unavailable non-Java® container, unimpacted applications continue to service requests thereby optimally using the resources.

18 Claims, 5 Drawing Sheets

(56) References Cited

OTHER PUBLICATIONS

"ActiveBatch Overview," http://www.wst-project.it/private/images/PDF/activebatch_overview.pdf, 2005.

Hennessey, Eric, "High Availability for Mission-Critical Applications," http://eval.symantec.com/mktginfo/enterprise/white_papers/b-ha_for_mca_vcs_hadr_WP_14187067.en-us.pdf, 2007.

Datasheet for VERITAS™ Cluster Server, http://eval.veritas.com/mktginfo/products/Datasheets/High_Availability/vcs_datasheet.pdf, Mar. 2003.

"VERITAS Cluster Server™ Agent 4.1 for WebSphere Application Server," Oct. 2005.

"WebSphere Application Server Network Deployment V6: High Availability Solutions," Oct. 2005.

\* cited by examiner

PROVIDING HIGH AVAILABILITY TO A HYBRID APPLICATION SERVER ENVIRONMENT CONTAINING NON-JAVA CONTAINERS

TECHNICAL FIELD

The present invention relates generally to application servers, and more particularly to handling non-Java® container failures without making the entire hybrid application server, containing both a Java® container and a non-Java® container, become unavailable to service the requests routed by a routing agent, such as a reverse proxy server (e.g., Hypertext Transfer Protocol (HTTP) proxy server).

BACKGROUND

An application server provides software applications with services such as security, data services, transaction support, load balancing and management of large distributed systems. One type of application server is the Java® EE application server used to support the Java Platform, Enterprise Edition (Java® EE). The Java® EE application server can handle transactions, security, scalability, concurrency and management of the components that are deployed to it in order to enable developers to concentrate more on the business logic of the components rather than on infrastructure and integration tasks.

Customers using legacy applications, such as Common Business-Oriented Language (COBOL), may desire to re-host such applications within a Java® EE application server based upon the Java® Virtual Machine (JVM®) environment, where new developments are currently occurring thereby propelling the adaptation of new technologies by legacy applications by leveraging the features provided by the modern Java® EE application server environment.

One manner of legacy applications leveraging the features provided by the modern Java® EE application server environment is through the use of a "hybrid" application server, which may contain one or more Java® EE containers and one or more non-Java® containers. The hybrid application server allows hosting of applications written in multiple programming languages, such as Java® and COBOL. A "container" may refer to a data structure used for storing and executing applications. For example, a Java® EE container may be used for hosting Java® EE applications running on a JVM®; whereas, the non-Java® container may be used for hosting non-Java® applications, such as COBOL applications. The non-Java® container may also host applications written in non-Java® styles, such as Customer Information Control System (CICS), etc. One or more of the Java® EE applications within the Java® EE container may call the applications being hosted in the non-Java® container.

In some implementations, there may be several of these hybrid application servers that are combined to form a "cluster." Requests to these clusters may be routed through routing agents, such as a reverse proxy server (e.g., Hypertext Transfer Protocol (HTTP) proxy server). A proxy server is a specific type of application server that acts as an intermediary for requests from clients seeking resources. One type of proxy server is a HTTP proxy server that routes HTTP requests to applications within the cluster of hybrid application servers that perform the work.

In such an implementation, the routing agent redirects the incoming requests to various hybrid application servers within the cluster based on a chosen routing algorithm. If a request is received by a Java® EE application (within the Java® EE container of the hybrid application server) that makes a call to a non-Java® application (within the non-Java® container of the hybrid application server), then it will be serviced by the non-Java® application.

Currently, the routing agent, such as a proxy server, only has knowledge of the availability of the Java® EE applications to service the requests by monitoring the JVM®s and sending only those requests to the Java® EE applications running on a JVM® that is operating. Once the JVM® becomes nonoperational, it will be marked as unavailable by the proxy server.

If, however, the non-Java® container of the hybrid application server within the cluster becomes unavailable, such as by a failure, the routing agent would have no knowledge of such an unavailability. Since the routing agent only has knowledge of the availability of the Java® EE applications, the routing agent will continue to send requests to the Java® EE applications (within the Java® EE container of the hybrid application server) that call the unavailable non-Java® applications within the unavailable non-Java® container. As a result, such requests would encounter errors and could not be serviced.

One manner of addressing such a situation is to have an object in the Java® EE container monitor the availability of the non-Java® container. When it becomes unavailable, the entire hybrid application server of the cluster will become deactivated. However, by deactivating the entire hybrid application server of the cluster, it prevents the routing agent from sending requests to those Java® EE applications within that hybrid application server that do not call the non-Java® applications within the unavailable non-Java® container thereby unnecessarily reducing the number of applications to service the requests which results in the inefficient use of the resources.

BRIEF SUMMARY

In one embodiment of the present invention, a method for providing high availability to a hybrid application server environment containing non-Java® containers comprises searching for dependency information stored within an application framework to determine which Java® applications in a Java® container were dependent on non-Java® applications deployed in a non-Java® container in response to detecting the non-Java® container becoming unavailable. The Java® container and the non-Java® container reside within a hybrid application server of the cluster of hybrid application servers. The method further comprises identifying one or more of the Java® applications in the Java® container that are dependent on one or more of the non-Java® applications deployed in the non-Java® container. Furthermore, the method comprises deactivating the one or more Java® applications identified as being dependent on the one or more non-Java® applications deployed in the non-Java® container. Additionally, the method comprises marking the one or more Java® applications in the Java® container as becoming unavailable in response to the one or more Java® applications becoming deactivated. In addition, the method comprises sending, by a processor, requests to one or more of the Java® applications in the Java® container that are not marked as unavailable.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for providing high availability to a hybrid application server environment containing non-Java® containers. In one embodiment of the present invention, each hybrid application server in the cluster of hybrid application servers includes a Java® container and a non-Java® container storing Java® and non-Java® applications, respectively. An object, such as an MBean, residing in a Java® container monitors the status of the associated non-Java® container within the hybrid application server. Upon detecting the non-Java® container becoming unavailable (failing), the MBean identifies those Java® application(s) that are dependent on the non-Java® application(s) deployed in the unavailable non-Java® container using dependency information (dependencies between Java® application(s) and non-Java® application(s)) stored in an application deployment framework within the hybrid application server. Those Java® application(s) that have been identified as being dependent upon the non-Java® application(s) in the unavailable non-Java® container are deactivated by the MBean. The administrative component of a proxy server that provides requests to the hybrid application servers monitors the availability of the Java® applications. Upon detecting a Java® application(s) becoming unavailable, such as from being deactivated by the MBean, the administrative component marks those Java® application(s) as being unavailable. The proxy server then continues to send requests to those Java® application(s) that are not marked as being unavailable within that hybrid application server containing the unavailable non-Java® container. As a result of not deactivating the entire hybrid application server containing the unavailable non-Java® container and allowing those Java® application(s) that are not dependent upon non-Java® application(s) within the unavailable non-Java® container to service requests, more applications are allowed to service the requests from the proxy server than prior implementations thereby resulting in the optimal use of the resources.

While the following discusses the present invention in connection with using a proxy server as a routing agent, the principles of the present invention may be applied to any routing agent, such as Hypertext Transfer Protocol (HTTP) server plugins, on demand routers, etc. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
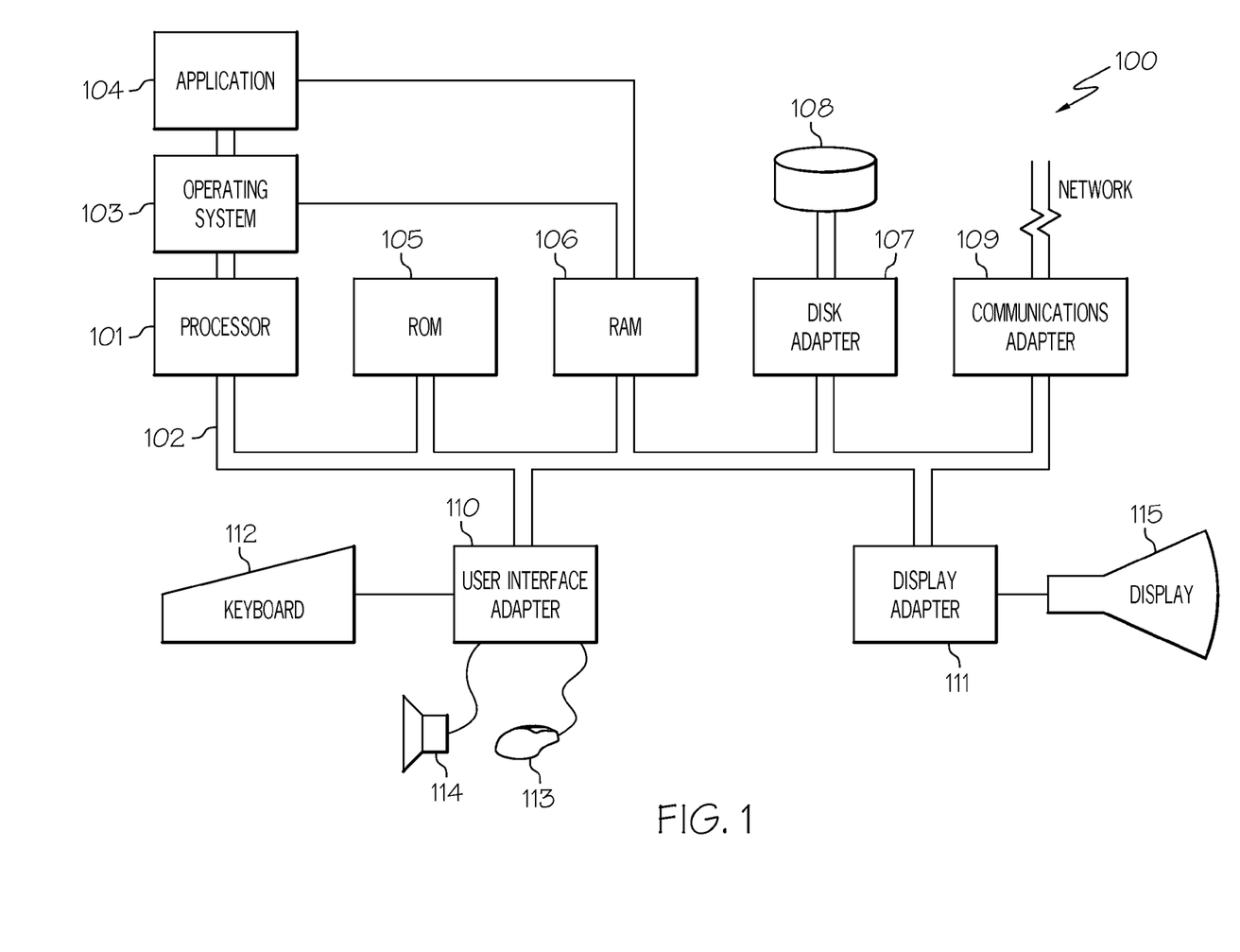
FIG. 1 illustrates a hardware configuration of a computer system configured in accordance with an embodiment of the present invention.

Referring now to the Figures in detail, FIG. 1 illustrates a hardware configuration of a computer system 100 which is representative of a hardware environment for practicing the present invention. Computer system 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, a program for handling non-Java® container failures in a cluster of hybrid application servers as discussed further below in association with FIGS. 2-5.

Referring again to FIG. 1, read-only memory ("ROM") 105 is coupled to system bus 102 and includes a basic input/output system ("BIOS") that controls certain basic functions of computer system 100. Random access memory ("RAM") 106 and disk adapter 107 are also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive.

Computer system 100 may further include a communications adapter 109 coupled to bus 102. Communications adapter 109 interconnects bus 102 with an outside network thereby enabling computer system 100 to communicate with other such systems.

I/O devices may also be connected to computer system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computer system 100 through keyboard 112 or mouse 113 and receiving output from computer system 100 via display 115 or speaker 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, if the non-Java® container of the hybrid application server within the cluster becomes unavailable, such as by a failure, the routing agent would have no knowledge of such an unavailability. Since the routing agent only has knowledge of the availability of the Java® EE applications deployed in the Java® EE containers, the routing agent will continue to send requests to the Java® EE applications (within the Java® EE container of the hybrid application server) that call the unavailable non-Java® applications within the unavailable non-Java® container. As a result, such requests would encounter errors and could not be serviced. One manner of addressing such a situation is to have an object in the Java® EE container monitor the availability of the non-Java® container. When it becomes unavailable, the entire hybrid application server of the cluster will become deactivated. However, by deactivating the entire hybrid application server of the cluster, it prevents the routing agent from sending requests to those Java® EE applications within that hybrid application server that do not call the non-Java® applications within the unavailable non-Java® container thereby unnecessarily reducing the number of applications to service the requests which results in the inefficient use of the resources.

Figure 2:
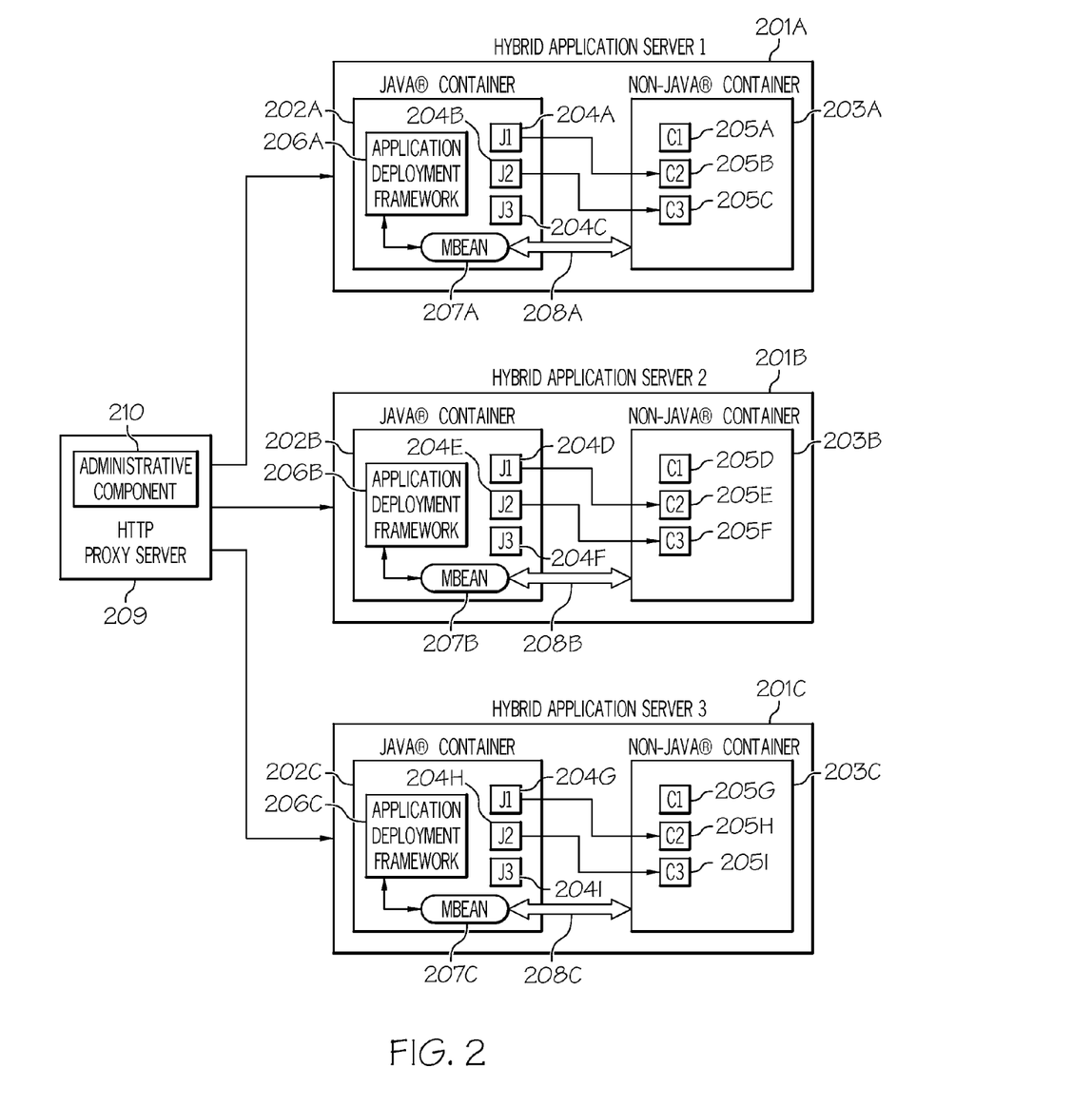
FIG. 2 illustrates the mechanism for handling non-Java® container failures in a cluster of hybrid application servers in accordance with an embodiment of the present invention.
Figure 3:
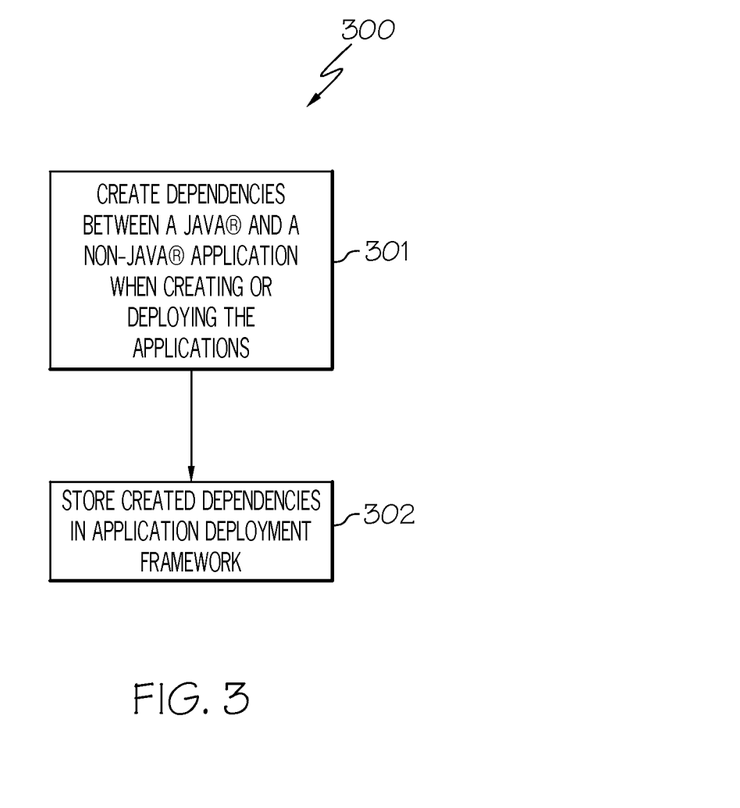
FIG. 3 is a flowchart of a method for creating and storing dependencies between the Java® and non-Java® applications stored in the Java® and non-Java® containers, respectively, in accordance with an embodiment of the present invention.
Figure 4:
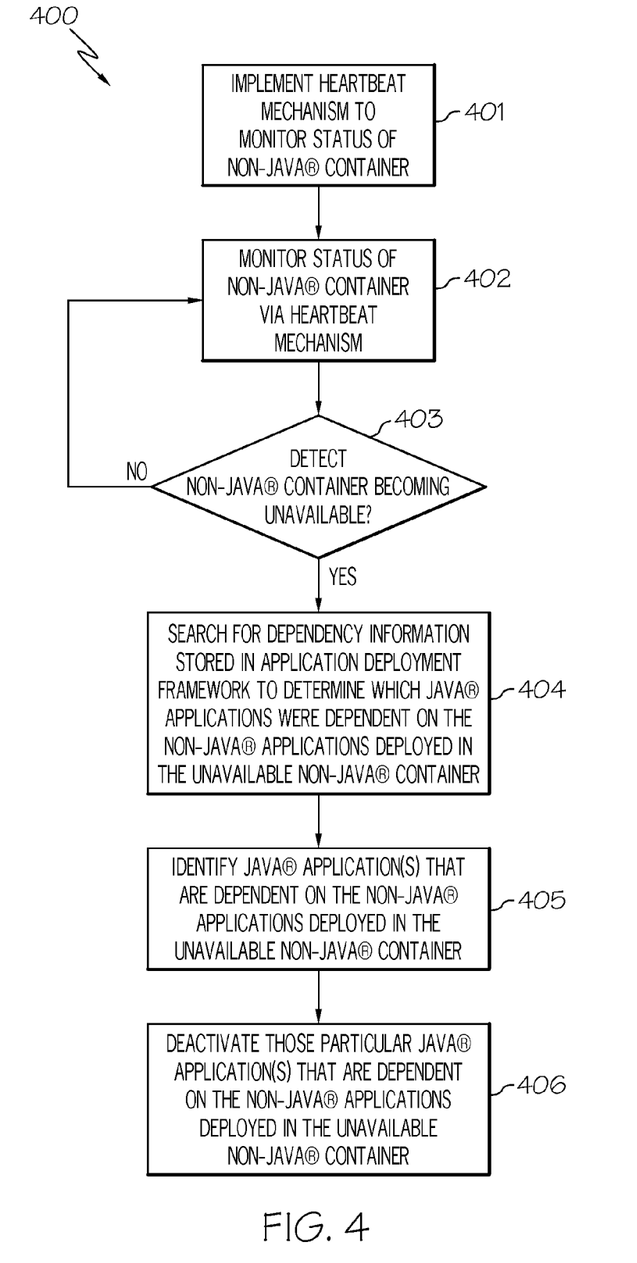
FIG. 4 is a flowchart of a method for deactivating those Java® applications in the Java® container that are dependent upon a non-Java® application within an unavailable non-Java® container of a hybrid application server in accordance with an embodiment of the present invention.
Figure 5:
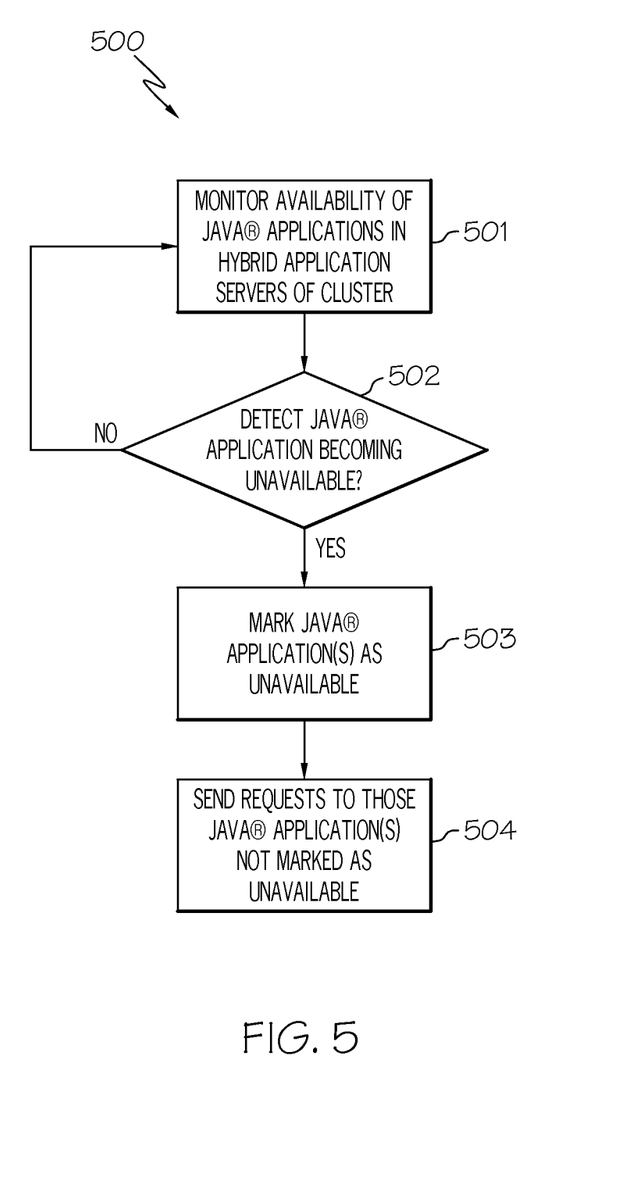
FIG. 5 is a flowchart of a method for providing high availability to a hybrid application server environment containing non-Java® containers in accordance with an embodiment of the present invention.

The principles of the present invention provide a means for handling non-Java® container failures in a cluster of hybrid application servers without necessarily deactivating the entire hybrid application server containing the failed (unavailable) non-Java® container as discussed further below in connection with FIGS. 2-5. FIG. 2 illustrates the mechanism for handling non-Java® container failures in a cluster of hybrid application servers. FIG. 3 is a flowchart of a method for creating and storing dependencies between the Java® and non-Java® applications stored in the Java® and non-Java® containers, respectively. FIG. 4 is a flowchart of a method for deactivating those Java® applications in the Java® container that are dependent upon a non-Java® application within an unavailable non-Java® container of a hybrid application server. FIG. 5 is a flowchart of a method for providing high availability to a hybrid application server environment containing non-Java® containers. That is, FIG. 5 is a flowchart of a method for handling non-Java® container failures in a cluster of hybrid application servers without necessarily deactivating the entire hybrid application server containing the failed (unavailable) non-Java® container.

Referring now to FIG. 2, as stated above, FIG. 2 illustrates the mechanism for handling non-Java® container failures in a cluster of hybrid application servers in accordance with an embodiment of the present invention. In one embodiment, the mechanism includes software components that may reside in application 104 (FIG. 1).

The following provides a brief description of these software components. A more detailed description of these software components is provided below in conjunction with FIGS. 3-5, where their functionalities are discussed in connection with the methods of FIGS. 3-5.

As shown in FIG. 2, a cluster of hybrid application servers 201A-201C (identified as "Hybrid Application Server 1," "Hybrid Application Server 2," and "Hybrid Application Server 3," respectively) exists to service requests for applications written in multiple programming languages, such as Java®, COBOL, etc. Hybrid Application Servers 201A-201C may collectively or individually be referred to as hybrid application servers 201 or hybrid application server 201, respectively.

In one embodiment, each hybrid application server 201 includes a Java® container and a non-Java® container. For example, hybrid application servers 201A-201C include Java® containers 202A-202C and non-Java® containers 203A-203C, respectively. Java® containers 202A-202C may collectively or individually be referred to as Java® containers 202 or Java® container 202, respectively. Non-Java® containers 203A-203C may collectively or individually be referred to as non-Java® containers 203 or non-Java® container 203, respectively. Containers 202, 203 refer to a data structure used for hosting applications. For instance, Java® container 202 is used for hosting Java® applications; whereas, non-Java® container 203 is used for hosting non-Java® applications. For example, Java® container 202A hosts Java® applications 204A-204C (identified by "J1," "J2," and "J3" within Java® container 202A). Java® container 202B hosts Java® applications 204D-204F (identified by "J1," "J2," and "J3" within Java® container 202B). Furthermore, Java® container 202C hosts Java® applications 204G-204I (identified by "J1," "J2," and "J3" within Java® container 202C). Similarly, non-Java® container 203A hosts non-Java® applications 205A-205C (identified by "C1," "C2," and "C3" within non-Java® container 203A). Non-Java® container 203B hosts non-Java® applications 205D-205F (identified by "C1," "C2," and "C3" within non-Java® container 203B). Furthermore, non-Java® container 203C hosts non-Java® applications 205G-205I (identified by "C1," "C2," and "C3" within non-Java® container 203C). Java® applications 204A-204I may collectively or individually be referred to as Java® applications 204 or Java® application 204, respectively. Furthermore, non-Java® applications 205A-205I may collectively or individually be referred to as non-Java® applications 205 or non-Java® application 205, respectively. While FIG. 2 illustrates three Java® applications 204 and three non-Java applications 205 in each container 202, 203, respectively, each container 202, 203 may contain any number of Java® applications 204 and non-Java® applications 205, respectively. Furthermore, Java® containers 202, as used herein, can include any type of Java® container, such as a Java® EE container. Additionally, Java® applications 204, as used herein, can include any type of Java® application, such as a Java® EE application.

As illustrated in FIG. 2, Java® applications 204 may be dependent upon a non-Java application 205. That is, a Java® application 204 (within a Java EE® container 202) may call a non-Java® application 205 (within a non-Java® container 203). For example, Java® application 204A calls non-Java® application 205B. In another example, Java® application 204B calls non-Java® application 205C. Similarly, as depicted in FIG. 2, Java® application 204D calls non-Java® application 205E, Java® application 204E calls non-Java® application 205F, Java® application 204G calls non-Java® application 205H and Java® application 204H calls non-Java® application 205I. While FIG. 2 illustrates two Java® applications 204 calling two non-Java® applications 205 in each hybrid application server 201, any number of Java® applications 204 may call a non-Java® application 205 in hybrid application server 201. Furthermore, each Java® application 204 may call any particular non-Java® application 205 within non-Java® container 203 within its own hybrid application server 201.

As further illustrated in FIG. 2, each Java® container 202 may contain an application framework, referred to herein as the "application deployment framework," which is used for storing dependency information. For example, Java® container 202A contains application deployment framework 206A. Java® container 202B contains application deployment framework 206B. Furthermore, Java® container 202C contains application deployment framework 206C. Application deployment frameworks 206A-206C may collectively or individually be referred to as application deployment frameworks 206 or application deployment framework 206, respectively. As discussed above, application deployment frameworks 206 stores the dependency information, such as the dependency a Java® application 204 has with a non-Java® application 205. For example, application deployment framework 206A stores the dependency of Java® application 204A on non-Java® application 205B as well as the dependency of Java® application 204B on non-Java® application 205C. Similarly, application deployment framework 206B stores the dependency of Java® application 204D on non-Java® application 205E as well as the dependency of Java® application 204E on non-Java® application 205F. Furthermore, application deployment framework 206C stores the dependency of Java® application 204G on non-Java® application 205H as well as the dependency of Java® application 204H on non-Java® application 205I. The creation and storing of such dependencies will be discussed below in connection with FIG. 3. Furthermore, the use of such dependencies in connection with handling non-Java® container failures without necessarily deactivating the entire hybrid application server 201 containing the failed (unavailable) non-Java® container 203 is discussed further below in connection with FIGS. 4-5.

Each Java® container 202 may further include an object, such as a Java® object (e.g., Managed Bean, which is called "MBean"), for monitoring the status of the associated non-Java® container 203 within its hybrid application server 201. For example, Java® container 202A includes MBean 207A for monitoring the status of non-Java® container 203A. Java® container 202B includes MBean 207B for monitoring the status of non-Java® container 203B. Furthermore, Java® container 202C includes MBean 207C for monitoring the status of non-Java® container 203C. MBeans 207A-207C may collectively or individually be referred to as MBeans 207 or MBean 207, respectively. In one embodiment, MBean 207 implements a heartbeat mechanism for monitoring the status of its associated non-Java® container 203. In one embodiment, the heartbeat mechanism is implemented by MBeans 207A-207C via a socket 208A-208C to non-Java® containers 203A-203C, respectively. Sockets 208A-208C may collectively or individually be referred to as sockets 208 or socket 208, respectively. A further discussion of the use of heartbeat mechanism to monitor and detect an unavailability or failure of non-Java® container 203 is discussed further below in association with FIG. 5.

Upon detecting a non-Java® container 203 becoming unavailable, MBean 207 may search the dependency information stored in application deployment framework 206 to determine which Java® applications 204 were dependent on non-Java® applications 205 deployed in the unavailable non-Java container 203. For example, if non-Java® container 203A failed, then, upon detecting such a failure, MBean 207 would identify Java® applications 204A, 204B as being dependent upon non-Java® applications 205B, 205C, respectively, from the dependency information stored in application deployment framework 206A. MBean 207 would then deactivate those Java® applications 204A, 204B thereby allowing Java® application 204C in hybrid application server 201A to continue to receive requests despite the fact that non-Java® container 203A is unavailable. As will be explained in greater detail below, by only deactivating those Java® applications 204 that are dependent upon non-Java® applications 205 deployed in an unavailable non-Java container 203, the entire hybrid application server 201, such as hybrid application server 201A, does not need to be deactivated thereby allowing those Java® applications 204, such as Java® application 204C, that are not dependent upon non-Java® applications 205 to remain active and to continue to receive requests from the proxy server. In this manner, the number of applications to service the requests from the proxy server is not unnecessarily reduced.

FIG. 2 further illustrates a routing agent, such as proxy server 209 (e.g., Hypertext Transfer Protocol (HTTP) proxy server), which acts as an intermediary for requests from clients seeking resources. In one embodiment, HTTP proxy server 209 routes HTTP requests to applications 204, 205 within the cluster hybrid application servers 201 that perform the work. While the following discusses the present invention in connection with using a proxy server as a routing agent, the principles of the present invention may be applied to any routing agent, such as Hypertext Transfer Protocol (HTTP) server plugins, on demand routers, etc. A person of ordinary skill in the art would be capable of applying the principles of the present invention to such implementations. Further, embodiments applying the principles of the present invention to such implementations would fall within the scope of the present invention.

In one embodiment, HTTP proxy server 209 includes an administrative component 210 configured to monitor the available of Java® applications 204 within Java® container 202. Upon detecting a Java® application(s) 204 becoming unavailable, such as from MBean 207 deactivating those Java® application(s) 204, administrative component 210 marks those Java® application(s) 204 as becoming unavailable thereby preventing HTTP proxy server 209 from sending requests to those Java® application(s) 204. Furthermore, by marking those Java® application(s) 204 that became unavailable, it enables HTTP proxy server 209 to continue to send requests to those Java® application(s) 204 that have not been marked unavailable, including those within a hybrid application server 201 containing an unavailable or failed non-Java® container 203. Referring to the above example, if non-Java® container 203A failed, then, upon detecting such a failure, MBean 207 would identify Java® applications 204A, 204B as being dependent upon non-Java® applications 205B, 205C, respectively, from the dependency information stored in application deployment framework 206A. MBean 207 would then deactivate those Java® applications 204A, 204B. Administrative component 210 would then mark those deactivated Java® applications 204A, 204B as being unavailable thereby allowing Java® application 204C in hybrid application server 201A to continue to receive requests from proxy server 209 despite the fact that non-Java® container 203A is unavailable in hybrid application server 201A. In this manner, the number of applications to service the requests from proxy server 209 is not unnecessarily reduced.

As discussed above, dependency information is stored within application deployment framework 206. The creation and storage of such dependencies will be discussed below in connection with FIG. 3.

FIG. 3 is a flowchart of a method 300 for creating and storing dependencies between the Java® applications 204 (FIG. 2) and non-Java® applications 205 (FIG. 2) hosted in the Java® containers 202 (FIG. 2) and non-Java® containers 203 (FIG. 2), respectively, in accordance with an embodiment of the present invention.

Referring to FIG. 3, in conjunction with FIGS. 1-2, in step 301, the dependencies between a Java® application 204 (e.g., Java® application 204A) and a non-Java® application 205 (e.g., non-Java® application 205A) is created when creating or deploying the applications.

In step 302, the created dependencies are stored in application deployment framework 206 (e.g., application deployment framework 206A). In one embodiment, hybrid application server 201 will use frameworks, such as Open Services Gateway Initiative (OSGI) and Business-Level Application (BLA), for application deployment. In one embodiment, the dependency information stored in application deployment framework 206 will be available at runtime through Application Programming Interfaces (APIs).

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

The dependency information stored in application deployment framework 206 may be used by MBean 207 to determine which Java® applications 204 to be deactivated as discussed below in connection with FIG. 4.

FIG. 4 is a flowchart of a method 400 for deactivating those Java® applications 204 in Java® container 202 that are dependent upon a non-Java® application 205 within an unavailable non-Java® container 203 of hybrid application server 201 in accordance with an embodiment of the present invention.

Referring to FIG. 4, in conjunction with FIGS. 1-2, in step 401, MBean 207 (e.g., MBean 207A) implements the heartbeat mechanism to monitor the status of non-Java® container 203 (non-Java® container 203A). As discussed above, the heartbeat mechanism may be implemented in various ways, such as via a socket 208 to the monitored non-Java® container 203.

In step 402, MBean 207 (e.g., MBean 207A) monitors the status of non-Java® container 203 (non-Java® container 203A) via the heartbeat mechanism.

In step 403, a determination is made by MBean 207 as to whether it detects the monitored non-Java® container 203 (non-Java® container 203A) becoming unavailable (failure in operation of non-Java® container 203).

If the monitored non-Java® container 203 (non-Java® container 203A) is currently available, then MBean 207 (e.g., MBean 207A) continues to monitor the status of non-Java® container 203 (non-Java® container 203A) via the heartbeat mechanism.

If, however, the monitored non-Java® container 203 (non-Java® container 203A) becomes unavailable, then, in step 404, MBean 207 (e.g., MBean 207A) searches for dependency information stored in application deployment framework 206 to determine which Java® applications 204 were dependent on non-Java® applications 205 deployed in non-Java® container 203 that has become unavailable.

In step 405, MBean 207 (e.g., MBean 207A) identifies Java® application(s) 204 (e.g., Java® applications 204A, 204B) that are dependent on non-Java® application(s) 205 (e.g., non-Java® applications 205B, 205C) deployed in the unavailable non-Java® container 203 (e.g., non-Java® container 203A).

In step 406, MBean 207 (e.g., MBean 207A) deactivates those particular Java® application(s) 204 (e.g., Java® applications 204A, 204B) that are dependent on non-Java® application(s) 205 (e.g., non-Java® applications 205B, 205C) deployed in the unavailable non-Java® container 203 (e.g., non-Java® container 203A). That is, MBean 207 (e.g., MBean 207A) deactivates those particular Java® application(s) 204 identified in step 405.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

As discussed above, administrative component 210 of proxy server 209 monitors the availability of Java® applications 204. When MBean 207 deactivates Java® application(s) 204, the deactivation is detected by administrative component 210. Such information is used by proxy server 209 to continue to route requests, such as HTTP requests, to those Java® application(s) 204 not deactivated despite being located within a hybrid application server 201 containing an unavailable non-Java® container 203 as discussed further below in connection with FIG. 5.

FIG. 5 is a flowchart of a method 500 for providing high availability to a hybrid application server environment (cluster of hybrid application servers 201 as shown in FIG. 2) containing non-Java® containers 203 (FIG. 2) in accordance with an embodiment of the present invention. That is, FIG. 5 is a flowchart of a method 500 for handling non-Java® container 203 failures in a cluster of hybrid application servers 201 without necessarily deactivating the entire hybrid application server 201 containing the failed (unavailable) non-Java® container 203 in accordance with an embodiment of the present invention.

Referring to FIG. 5, in conjunction with FIGS. 1-2, in step 501, administrative component 210 monitors the availability of Java® applications 204 in hybrid application servers 201.

In step 502, a determination is made by administrative component 210 as to whether it detects a Java® application(s) 204 becoming unavailable, such as by MBean 207 deactivating those Java® application(s) 204.

If administrative component 210 does not detect any Java® application 204 becoming unavailable, then administrative component 210 continues to monitor the availability of Java® applications 204 in hybrid application servers 201 in step 501.

If, however, administrative component 210 detects a Java® application(s) 204 becoming unavailable, then, in step 503, administrative component 210 marks those Java® application(s) 204 as being unavailable.

In step 504, proxy server 210 sends requests to those Java® application(s) 204 not marked as unavailable within that hybrid application server 201 containing the unavailable non-Java® container 203. For example, if non-Java® container 203 became unavailable, then Java® applications 204A, 204B would be deactivated and marked as unavailable by administrative component 210. However, since Java® application 204C is still active (not dependent upon non-Java® applications 205 in unavailable non-Java® container 203) and hybrid application server 201A is not entirely deactivated, then proxy server 209 can continue to send requests to Java® application 204C thereby allowing more applications to service the requests from proxy server 209 than prior implementations.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for providing high availability to a hybrid application server environment containing non-Java® containers, the method comprising:

searching for dependency information stored within an application framework to determine which Java® applications in a Java® container were dependent on non-Java® applications deployed in a non-Java® container in response to detecting said non-Java® container becoming unavailable, wherein said Java® container and said non-Java® container reside within a hybrid application server of said cluster of hybrid application servers;

identifying one or more of said Java® applications in said Java® container that are dependent on one or more of said non-Java® applications deployed in said non-Java® container;

deactivating said one or more Java® applications identified as being dependent on said one or more non-Java® applications deployed in said non-Java® container;

marking said one or more Java® applications in said Java® container as becoming unavailable in response to said one or more Java® applications becoming deactivated; and sending, by a processor, requests to one or more of said Java® applications in said Java® container that are not marked as unavailable.

2. The method as recited in claim 1 further comprising:

creating dependencies between a first application and a second application when creating or deploying said first and said second applications, wherein said first application is a Java® application and said second application is a non-Java® application, wherein said first application is stored within said Java® container and said second application is stored within said non-Java® container; and storing said created dependencies in said application framework.

3. The method as recited in claim 1 further comprising:
implementing a heartbeat mechanism to monitor a status of said non-Java® container; and
monitoring said status of said non-Java® container via said heartbeat mechanism.

4. The method as recited in claim 3, wherein said heartbeat mechanism is implemented by an object residing within said Java® container.

5. The method as recited in claim 3, wherein said heartbeat mechanism is implemented via a socket to said non-Java® container.

6. The method as recited in claim 1 further comprising:
monitoring an availability of said Java® applications in said Java® container; and
detecting said one or more Java® applications becoming deactivated.

7. A computer program product embodied in a non-transitory computer readable storage medium for providing high availability to a hybrid application server environment containing non-Java® containers, the computer program product comprising the programming instructions for:
searching for dependency information stored within an application framework to determine which Java® applications in a Java® container were dependent on non-Java® applications deployed in a non-Java® container in response to detecting said non-Java® container becoming unavailable, wherein said Java® container and said non-Java® container reside within a hybrid application server of said cluster of hybrid application servers;
identifying one or more of said Java® applications in said Java® container that are dependent on one or more of said non-Java® applications deployed in said non-Java® container;
deactivating said one or more Java® applications identified as being dependent on said one or more non-Java® applications deployed in said non-Java® container;
marking said one or more Java® applications in said Java® container as becoming unavailable in response to said one or more Java® applications becoming deactivated; and
sending requests to one or more of said Java® applications in said Java® container that are not marked as unavailable.

8. The computer program product as recited in claim 7 further comprising the programming instructions for:
creating dependencies between a first application and a second application when creating or deploying said first and said second applications, wherein said first application is a Java® application and said second application is a non-Java® application, wherein said first application is stored within said Java® container and said second application is stored within said non-Java® container; and
storing said created dependencies in said application framework.

9. The computer program product as recited in claim 7 further comprising the programming instructions for:
implementing a heartbeat mechanism to monitor a status of said non-Java® container; and
monitoring said status of said non-Java® container via said heartbeat mechanism.

10. The computer program product as recited in claim 9, wherein said heartbeat mechanism is implemented by an object residing within said Java® container.

11. The computer program product as recited in claim 9, wherein said heartbeat mechanism is implemented via a socket to said non-Java® container.

12. The computer program product as recited in claim 7 further comprising the programming instructions for:
monitoring an availability of said Java® applications in said Java® container; and
detecting said one or more Java® applications becoming deactivated.

13. A system, comprising:
a memory unit for storing a computer program for providing high availability to a hybrid application server environment containing non-Java® containers; and
a processor coupled to said memory unit, wherein said processor, responsive to said computer program, comprises:
circuitry for searching for dependency information stored within an application framework to determine which Java® applications in a Java® container were dependent on non-Java® applications deployed in a non-Java® container in response to detecting said non-Java® container becoming unavailable, wherein said Java® container and said non-Java® container reside within a hybrid application server of said cluster of hybrid application servers;
circuitry for identifying one or more of said Java® applications in said Java® container that are dependent on one or more of said non-Java® applications deployed in said non-Java® container;
circuitry for deactivating said one or more Java® applications identified as being dependent on said one or more non-Java® applications deployed in said non-Java® container;
circuitry for marking said one or more Java® applications in said Java® container as becoming unavailable in response to said one or more Java® applications becoming deactivated; and
circuitry for sending requests to one or more of said Java® applications in said Java® container that are not marked as unavailable.

14. The system as recited in claim 13, wherein said processor further comprises:
circuitry for creating dependencies between a first application and a second application when creating or deploying said first and said second applications, wherein said first application is a Java® application and said second application is a non-Java® application, wherein said first application is stored within said Java® container and said second application is stored within said non-Java® container; and
circuitry for storing said created dependencies in said application framework.

15. The system as recited in claim 13, wherein said processor further comprises:
circuitry for implementing a heartbeat mechanism to monitor a status of said non-Java® container; and
circuitry for monitoring said status of said non-Java® container via said heartbeat mechanism.

16. The system as recited in claim 15, wherein said heartbeat mechanism is implemented by an object residing within said Java® container.

17. The system as recited in claim 15, wherein said heartbeat mechanism is implemented via a socket to said non-Java® container.

18. The system as recited in claim 13, wherein said processor further comprises:
   circuitry for monitoring an availability of said Java® applications in said Java® container; and
   circuitry for detecting said one or more Java® applications becoming deactivated.

\* \* \* \* \*